United States Patent [19]
Pfenninger et al.

[11] Patent Number: 6,136,942
[45] Date of Patent: Oct. 24, 2000

[54] LATENT AMINO GROUPS AND ISOCYANATE GROUPS COMPRISING POLYURETHANE PREPOLYMERS, METHOD FOR THEIR PRODUCTION AND THEIR USE

[75] Inventors: Ueli Pfenninger, Au; Pierre-André Bütikofer, Hittnau, both of Switzerland

[73] Assignee: Sika AG, vorm. Kaspar Winkler & Co., Au, Switzerland

[21] Appl. No.: 09/281,921

[22] Filed: Mar. 31, 1999

[30] Foreign Application Priority Data

Apr. 2, 1998 [CH] Switzerland ............... 799/98

[51] Int. Cl.[7] ................................... C08G 18/32
[52] U.S. Cl. ................... 528/73; 528/62; 528/64; 544/335; 252/182.2; 548/334.1; 564/47; 564/50
[58] Field of Search ................. 528/73, 62, 64; 544/335; 252/182.2; 548/334.1; 564/47, 50

[56] References Cited

U.S. PATENT DOCUMENTS

| | | | |
|---|---|---|---|
| 4,404,379 | 9/1983 | Hajek et al. | 544/231 |
| 4,853,454 | 8/1989 | Merger et al. | 528/59 |

FOREIGN PATENT DOCUMENTS

| | | |
|---|---|---|
| 469751 | 2/1992 | European Pat. Off. . |

*Primary Examiner*—Rachel Gorr
*Attorney, Agent, or Firm*—Burns, Doane, Swecker & Mathis, L.L.P.

[57] ABSTRACT

A one-component polyurethane composition is described that comprises a latent curing agent bonded to the prepolymer, from which curing agent aldehyde is liberated upon curing. Said aldehyde comprises two phenyl groups. By the specific design of the polyurethane composition, the application characteristics as well as the aging resistance of the cured polyurethane are improved.

13 Claims, No Drawings

LATENT AMINO GROUPS AND ISOCYANATE GROUPS COMPRISING POLYURETHANE PREPOLYMERS, METHOD FOR THEIR PRODUCTION AND THEIR USE

CROSS REFERENCE TO RELATED APPLICATIONS

This application claims the priority of Swiss patent application No. 799/98, filed on Apr. 2, 1998, the disclosure of which is incorporated herein by reference in its entirety.

BACKGROUND OF THE INVENTION

The present invention relates to polyurethane compositions, in particular a humidity curing one-component polyurethane composition comprising a prepolymer which, besides of isocyanate groups, also comprises latent amino groups bonded to the prepolymer. The polyurethane composition can e.g. be used as filling composition for any kind of joints, as adhesive for elastic bonding or as elastic coating for sealing areas.

One-component polyurethane compositions comprising latent amines are known for a long time and broadly described. In comparison with usual one-component polyurethane compositions, that are cured by the reaction with ambient humidity, the compositions comprising latent amines have the advantage that upon curing by means of said latent amines no $CO_2$ is liberated and thus no blisters are formed.

GB 1,064,841 and EP 469,751 for example describe one-component polyurethanes that besides isocyanate groups comprising prepolymers comprise polyaldimines as latent amines.

The known systems, however, show the following disadvantages:

In order to cure, they need a relatively high amount of water. In order to add two moles of prepolymer chains, two moles water are needed. Two aldimine groups of a polyaldimin have to be hydrolyzed, so that each of the two liberated amino groups then can make an addition reaction with one isocyanate group of a polymer chain and accordingly two moles of aldehyde are liberated. These systems of the state of the art have therefore the disadvantage that they are slowly curing in places deep under the surface, since a relatively high amount of water has to diffuse through the already formed skin. Also for the application in thick layers, as they are often found in the case of sealing joints and elastic bonding, a fast through-curing of the whole layer is desired. Furthermore, the aldehyde formed during curing in quite large amounts can affect the features of the material.

EP 19 906 describes one-component polyurethane systems that, besides isocyanate groups comprising prepolymers, also comprise latent amines, namely polyurethanes comprising cycloaminals as latent amines. The cycloaminals are produced from a diamine with two secondary amino groups and an aldehyde. As substituents at the C-atoms of the ring hydrogen and alkyl groups are mentioned. Said systems only need one mole water for liberating the two secondary amino groups and thus for the addition of two isocyanate comprising prepolymer chains, and furthermore also only one mole of aldehyde is liberated. The use of secondary amines as curing agents in the polyurethane chemistry, however, has the disadvantages that the formation of hydrogen bonds between the ureas of the polymer chains are hindered due to the formed N-substituted ureas, thereby affecting the features of the material.

EP 1 065 describes one-component polyurethanes that comprise cycloaminals as latent amines whereby the cycloaminals are bonded to the isocyanate groups comprising prepolymer by means of urea groups. For the production of said cycloaminals amines with a secondary and a primary amino group are used.

According to EP 19 906 as well as EP 1 065, for the production of the cycloaminals preferably aldehydes are used, that lead to products with an insufficient storage stability, in particular in combination with the cheap aromatic isocyanates. Furthermore, these aldehydes, upon curing of the products, lead to an intense smell that is a great nuisance, in particular for the application on large areas and/or for the use of the polyurethane compositions in the interior of buildings.

BRIEF SUMMARY OF THE INVENTION

Hence, it is a general object of the present invention to provide a one-component polyurethane that is also fast curing upon application in thick layers, shows little tendency for blister formation and good storage stability, that is not annoying due to its smell and in particular leads to a cured product with improved aging resistance.

It has surprisingly been found that the object of the present invention is met by a system comprising latent amino groups bonded to the prepolymer, whereby an aldehyde of formula (V) (formula see below) has been used for the preparation of the latent amino groups. Such a system leads to products having an excellent storage stability even in combination with the cheaper aromatic isocyanates. Such a system furthermore cures without annoying smell emission and provides also in the cured state no smell emission as well as improved aging resistance.

The humidity curing one-component polyurethane composition according to the present invention comprises a prepolymer that, besides of isocyanate groups bonded to the prepolymer, furthermore comprises latent amino groups which amino groups are also bonded to the prepolymer. The polyurethane composition can e.g. be used as sealing composition for any kind of joints, as adhesive for elastic bonding or as elastic coating for sealing areas. It is characterized in that it cures without blisters formation and smell generation, is very economic and provides long-time stability.

DETAILED DESCRIPTION OF THE INVENTION

An object of the present invention is a prepolymer, comprising latent amino groups linked to the prepolymer, which latent amino groups have been produced using an aldehyde of formula V shown below.

In the scope of the present invention, latent amino groups are functional groups that upon contact with humidity hydrolyze to amino groups.

The latent amino groups can be aldimine groups or cycloaminal groups that are bonded to the polyurethane prepolymer by a urea group bond. Upon cleavage of an aldehyde both hydrolyze to amines.

The prepolymer according to the invention can be described by formula (I).

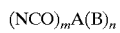   (I)

whereby

A = a (m+n)valent radical, as it is generated by the cleavage of (m+n) isocyanate groups from a (m+n) valent polyurethane prepolymer.

m = 1 or 2 n = 1 or 2

B = a latent amino group that is bond to A by a urea bond, as it is shown in formula (II) or (III).

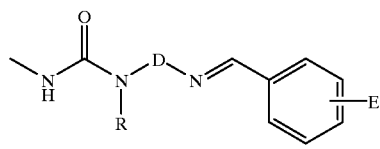

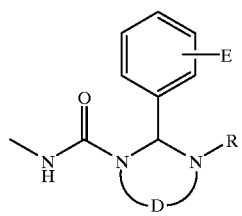

whereby

R represents an aliphatic hydrocarbon radical with 1 to 8 C-atoms, a cycloaliphatic hydrocarbon radical with 5 to 15 C-atoms or a phenyl radical or an alkylphenyl radical with 7 to 15 C-atoms, D represents a divalent aliphatic hydrocarbon radical with 1 to 8 C-atoms, a divalent cycloaliphatic hydrocarbon radical with 5 to 15 C-atoms or a divalent alkylphenyl radical with 7 to 15 C-atoms or, in the case of formula (II), R and D form together with the nitrogen atom a five-membered or six-membered ring, substituted by a hydrocarbon chain with 1 to 5 C-atoms, carrying the aldimine group, and E represents a phenyl radical, an alkylpehnyl radical, and in particular an optionally substituted phenyloxy radical, or an optionally substituted alkyloxyphenyl radical, whereby as substituents alkyl groups and alkyloxy groups are preferred. Although substituted phenyloxy radicals and alkyloxyphenyl radicals are possible, unsubstituted radicals are preferred, since they are more readily obtainable and therewith more economic.

The compound B is produced starting from a suitable diamine with a primary and a secondary amino group of the general formula (IV)

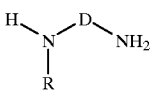   (IV)

whereby

R represents an aliphatic hydrocarbon radical with 1 to 8 C-atoms, a cycloaliphatic hydrocarbon radical with 5 to 15 C-atoms or a phenyl radical, or an alkylphenyl radical with 7 to 15 C-atoms, D represents a divalent aliphatic hydrocarbon radical with 1 to 8 C-atoms, a divalent cycloaliphatic hydrocarbon radical with 5 to 15 C-atoms, or a divalent alkylphenyl radical with 7 to 15 C-atoms, or R and D form together with the nitrogen atom of the secondary amino group a five-membered or six-membered ring, substituted by a hydrocarbon chain with 1 to 5 C-atoms, carrying the primary amino group.

As non limiting examples, the following amines are mentioned: N-methyl ethylenediamine, N-methyl propylenediamine, N-ethyl ethylenediamine, N-cyclohexyl propylenediamine, 4-aminomethyl piperidine, 3-(4-aminobutyl) piperidine and 4-amino benzylamine. N-aminoethyl piperazine is less suitable, since the tertiary amino group reduces the storage stability of the prepolymer according to the invention due to catalytic effects.

The diamine (IV) is reacted according to methods known from literature in a molar relation of 1:1 with a suitable aldehyde, whereby the water formed during condensation is removed, for example by means of a water separator.

The suitable aldehyde (V) is represented in the following formula

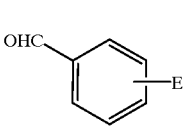   (V)

whereby E represents a phenyl radical, an alkylphenyl radical, and in particular an optionally substituted phenyloxy radical or an optionally substituted alkyloxylphenyl radical. (For the substitution of the radicals see above.)

As an especially suitable aldehyde the 3-phenyloxy benzaldehyde shall be mentioned, see formula below:

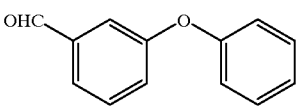

From a technical point of view, furfual were also suitable. However, in view of its toxicity furfural should not be used.

The reaction product of the above mentioned reaction can either be an amino aldimine (VI), see the following formula:

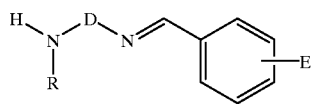

(VI)

or a cycloaminal (VII), see following formula:

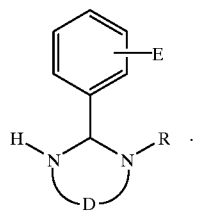

(VII)

During the reaction of the diamine (IV) with the aldehyde (V) usually cyclisation to a cycloaminal (VII) takes place, provided that the two nitrogen atoms of the diamine are separated by an ethylene unit or a propylene unit, so that a five-membered or a six-membered ring is formed. Additionally, the radical R at the secondary amino group has to be relatively small. If R is too large, the steric interaction between the radical R and the aldehyde radical condensed to the diamine effects that the cyclisation does not take place, so that instead of the cycloaminal the amino aldimine is formed. This is further discussed below with regard to two N-substituted propylene diamines. If R is for example a methyl group, then the cycloaminal (VII/1) is formed, if R is for example a cyclohexyl group, then the amino aldimine (VI/1) is formed, as represented in the schema below:

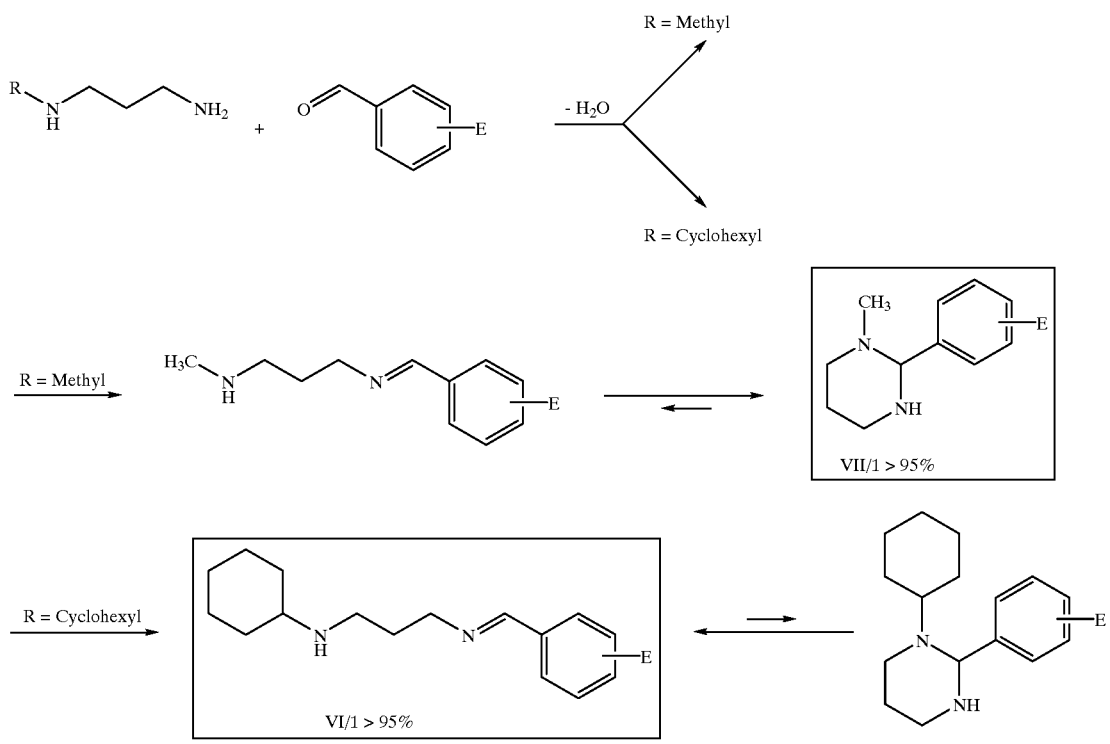

Both condensation products, the amino aldimine (VI) as well as the cycloaminal (VII) comprise an NH-group by which they can be added to an isocyanate group of a prepolymer according to methods known from literature, whereby the inventive polyurethane prepolymer (I) with isocyanate groups and latent amino groups is formed. According to Hesse et al., Helv. Chim. Acta 1997, 80, 996, a cycloaminal that has been produced starting from a propylenediamine with a secondary and a primary amino group and an aldehyd, can react at the primary as well as at the secondary nitrogen atom with an electrophilic compound or group, respectively, such as e.g. an isocyanate group, dependent on the dimension or the electronic structure of the substituents present. In the case of cycloaminals (VII) one has to assume that—as described in literature—the approach of the isocyanate group to the NH-group of the cycloaminal is hindered due to the large aromatic substituent at the animal-C, and that the molecule therefore presumably reacts at least in a major part by the tautomeric structure (VI)at the other nitrogen. This would mean that the reaction product of the isocyanate comprising prepolymer (VIII) with the cycloaminal (VII) is at least in a major part the same as the one with the amino-aldimine (VI), namely the polymer (I) according to the invention, whereby B were present in the form of structure (II), that is in the form of the aldimine. These considerations concerning the structure, however, shall by no means limit the invention.

A suitable prepolymer to which the amino-aldimine (VI) or the cycloaminal (VII) can be bound, is the reaction product of a polyol with a polyisocyanate, whereby the isocyanate component has been used in excess, so that, after the completion of the reaction of all OH-groups, a polyurethane prepolymer with isocyanate groups has been formed, represented by the general formula $$A(NCO)_{m+n}(VIII),$$

whereby A has the already described meaning. The mean molecular weight of this prepolymer is in the range of 500 to 20,000 g/moles.

Suitable polyols for the production of such a prepolymer are the following raw materials well known in the polyurethane chemistry, or mixtures of said raw materials:

Polyetherpolyols that are the polymerisation products from ethylene oxide, propylene oxide or butylene oxide or mixtures thereof, whereby in particular polyols with low unsaturation level (<0.07 double bond equivalents/mole) are advantageous, as well as polyester polyols, produced from divalent to trivalent alcohols such as for example ethylene glycol, propylene glycol, hexanediol, neopentyl glycol, glycerin, trimethylol propane or diethylene glycol with less than equimolar amounts of divalent carboxylic acids or their anhydrides or their esters such as e.g. adipic acid, phthalic acid, hexahydrophthalic anhydride, or maleic acid, or hydroxyterminated polybutadiene polymers.

The polyols, in general, show an OH-functionality of 1.5 to 3 and an average molecular weight from 500 to 20,000 g/mole.

In addition to the mentioned polyols, compounds with two or more OH-groups can be used as chain extenders or crosslinking agents. Mentioned as examples are 1,4-butane diol and trimethylol propane.

As polyisocyanates for the production of such a prepolymer aliphatic, cycloaliphatic or aromatic isocyanates with at least two isocyanate groups per molecules are useable. As non limiting examples, the following isocyanates, well known in polyurethane chemistry, are mentioned:

2,4- and 2,6-toluene diisocyanate, 4,4'- and 2,4'-diphenylmethane diisocyanate, isophorone diisocyanate, 2,2,4- and 2,4,4-trimethyl-1,6-hexamethylene diisocyanate, 1,6-hexamethylene diisocyante, m- and p-tetramethyl xylylene diisocyanate and the isomeres of 4,4'- or 2,4'-dicyclohexyl methane diisocyanate, as well as polymers or oligomers of said isocyanates as well as mixtures from two or more of the mentioned isocyanate components.

The polyol component and the isocyanate component are reacted according to usual methods, e.g. at temperatures of 50 to 100° C., optionally with co-use of suitable catalysts, whereby the isocyanate component is used in excess. As reaction product, the mentioned polyurethane prepolymer with isocyanate end groups is formed.

During the reaction of the amino-aldimins (VI) or the cycloaminals (VII), respectively, with the polyurethane prepolymer, the inventive prepolymer is formed that comprises isocyanate groups as well as latent amino groups (see formula below):

whereby B represents the appended latent amino group according to the following two formulas:

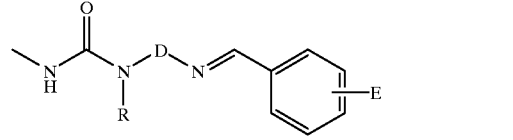

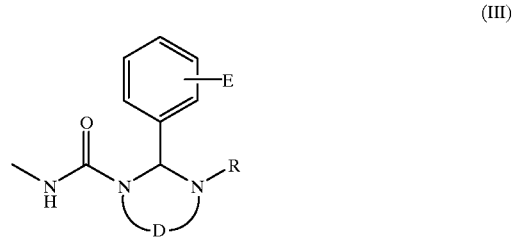

A, R, D and E have the already described meaning.

Both possible embodiments of B, the one with appended aldimine groups (II) as well as the one with appended cycloaminal groups (III) are latent amines. Upon contact with humidity, water reacts with the latent amine. The aldehyde used for blocking the amine thereby is separated and amino groups are formed that at once react with the isocyanate groups of the prepolymer of the present invention. The prepolymer chains thereby are connected with each other by urea group bonds. By a suitable catalysis, for example with organic acids or organic anhydrides, the deblocking of the latent amines with water can be selectively accelerated in comparison with the isocyanate water reaction.

The inventive prepolymer comprising isocyanate groups and latent amino groups (I) can additionally be admixed with a further polyisocyanate compound with two or more isocyanate groups, for example a diisocyanate monomer, a diisocyanate oligomer or a isocyanate terminated polyurethane prepolymer. The molar ratio of all isocyanate groups to the latent amino groups in sum is 1:1 to 1:0.2. If more isocyanate groups than latent amino groups are present, upon curing the excess isocyanate groups directly react with ambient humidity, whereby urea group bonds are formed under $CO_2$-liberation as well.

In comparison with usual compositions comprising the components prepolymer and polyaldimin in separated form, the inventive composition, requires only half the amount of water in order to perform cross-linking. One mole water is sufficient to add two moles of polymer chains, whereby one mole aldehyde is liberated. For this reason, it is excellently suitable for an application in thick layers, since less water has to diffuse through the already formed skin, and therefore a faster through-curing is achieved. This compositions are therefore in particular suitable for sealing joints and elastic bonding where a fast through-curing represents a great advantage.

The strength of the inventive polymer is faster built up than with usual systems with polyaldimines not bonded to the polymer. Since the latent amine in the inventive polymer is already bonded to the prepolymer chain, only half the amount of addition reactions are needed in order to build up the strength of the polymer. This results in the fact that the inventive polymer is less susceptible to blister formation, even if the latent amine is dosed in less than an equimolar amount. The pressure of the $CO_2$-gas formed during cross-linking of an excess of isocyanate groups can better be dealt with by the already established strength. Therefore, it is possible to formulate blister-free curing formulations comprising an excess of isocyanate groups in comparison with the latent amino groups. This has several advantages. On the one hand, costs can be reduced since the latent amines, in comparison with the other components, are expensive, on the other hand less aldehyde is liberated.

In polyurethanes, aldehydes have a plasticizing effect. In particular volatile aldehydes provide two essential disadvantages. First, the nuisance due to the smell during the working processing of the polyurethane composition, second, a possible nuisance due to the smell that, due to the diffusion of the aldehyde out of the cured composition lasts for a long time. But even if such diffusion would not result in an essential nuisance by the smell, in any case it leads to an embrittlement due to the reduction of the concentration of the plasticizing aldehyde.

In spite of especially selected additives, such compositions provide insufficient aging resistance.

Because of the specific "construction" of the inventive compositions, on the one hand the amount of liberated aldehyde can be kept low, and by the choice of the specific aldehyde with two aryl groups, the transfer of the aldehyde to the environment can almost entirely be avoided. A nuisance due to the smell during the processing of the composition and later on is not found and the aldehyde remains in the polyurethane, whereby the aging resistance is largely enhanced.

Phenoxy benzaldehyde has proved to be especially suitable.

The polymer of the invention cures upon contact with ambient humidity without smelling and without blister formation. It enables cheap formulations, since on the one hand it provides an excellent storage stability even if the cheaper aromatic isocyanates are used, on the other hand, it cures already without blisters formation if a comparatively low dosage of latent amino groups is used.

The inventive prepolymer can be used for the formulation of elastic sealing compositions, any kind of joints, adhesives for elastic bonding and coating compositions for sealing areas. In order to meet specific requirements, it can comprise additives such as plasticizers, solvents, inorganic or organic fillers, pigments, fibers, thixotropic agents, thickeners, flow improving agents, degassing agents, adhesion promoters, antioxidants, light protection agents and catalysts.

The following examples serve to further describe the invention, however, they are not intended to limit it in any way.

EXAMPLES

Remarks:
pbw is used as abbreviation for parts by weight.
The NCO-excess is expressed in percents by weight of NCO-groups referred to the whole formulation.

The storage stability has been determined by storing the compositions in closed containers at 60° C. for 14 days and following determination of the extrudability.

The tensile strength and the elongation at break have been determined at cured films according to DIN (German norms) 53504 (S2).

The combined tension and shear resistance has been determined on glass according to BS EN (British Standard European Norm) 1465:1995.

The blister formation was determined by curing at 60° C. on a fir-wood surface 110×40 mm in a wedge-shaped layer, starting with a layer thickness of 5 mm, spread out alongside to 0 mm.

The weight loss was determined at 40° C. on a cylinder-shaped sample body with a diameter of 34 mm and a high of 6 mm.

Example 1

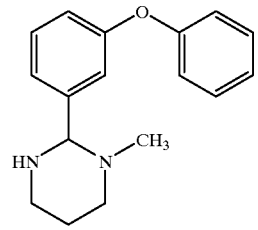

131.4 pbw 3-(methylamino) propylamine were given into a suitable apparatus, e.g. a four-necked glass-flask equipped with a mechanic stirrer, under nitrogen atmosphere. With cooling and good stirring, slowly 298.5 pbw 3-phenoxy benzaldehyde were added dropwise (time needed about 1 hour). Then the water produced during the reaction was distilled of under vacuum at 80° C.

The formed cycloaminal had an amine number of 415.5 mg KOH/g, the yield was 403.0 pbw.

Example 2

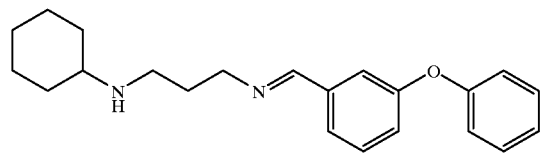

215.0 pbw 3-(cyclohexylamino) propylamine were given, into a suitable equipment, e.g. a four-necked glass-flask equipped with a mechanical stirrer, under nitrogen atmosphere. With cooling and good mixing, slowly 275.6 pbw 3-phenoxy benzaldehyde were added dropwise (duration about 1 hour). Then the water formed during the reaction was distilled off under vacuum at 80° C.

The formed amino-aldimine had an amine number of 328.3 mg KOH/g, the yield was 465.8 pbw.

Example 3

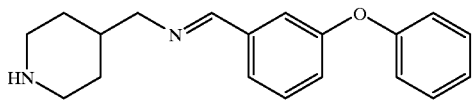

101.1 pbw 4-aminomethyl piperidine were given into a suitable equipment, e.g. a four-necked glass-flask equipped with a mechanical stirrer, under nitrogen atmosphere. With cooling and good stirring, slowly 177.3 pbw 3-phenoxy benzaldehyde were added dropwise (duration about 1 hour). Then the water formed during the reaction was distilled off under vacuum at 80° C.

The formed amino aldimine had an amine number of 378.4 mg KOH/g, the yield was 262.5 pbw.

Comparative Example 1

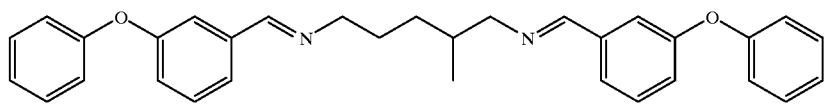

420 pbw 3-phenoxy benzaldehyde were given into a suitable equipment, e.g. a four-necked glass-flask equipped with a mechanical stirrer, under nitrogen atmosphere. With cooling and good stirring, slowly 121.9 pbw 2-methyl-1,5-pentanediamine were added dropwise (duration about 1 hour). Then the water formed during the reaction was distilled off under vacuum at 80° C.

The formed dialdimine had an amine number of 232 mg KOH/g, the yield was 504.1 pbw.

Comparative Example 2

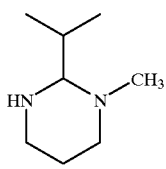

247.9 pbw 3-(methylamino) propylamine were given into a suitable equipment, e.g. a four-necked glass-flask equipped with a mechanical stirrer, under nitrogen atmosphere. With cooling and good stirring slowly 204.8 pbw isobutyraldehyde were added dropwise (duration about 1 hour). Then the water formed during the reaction was distilled off under vacuum at 80° C.

The formed cycloaminal had an amine number of 778.0 mg KOH/g, the yield was 402.1 pbw.

Example 4, TDI Prepolymer 240 pbw of a polypropylene oxide triol with a mean molecular weight of 4000, e.g. Voranol CP 4055 of Dow, 120 pbw of a polypropylene oxide diol with a mean molecular weight of 2000, e.g. Voranol CP 2025 of Dow, and 54 pbw toluene diisocyanate (mixture of 80% 2,4-isomer and 20% 2,6-isomer) were mixed under nitrogen atmosphere in a suitable apparatus, e.g. a four-necked glass-flask equipped with a mechanical stirrer, then stirred for 4 hours at 80° C. and then cooled and stored in a sealed container. The content of free isocyanate groups was 3.28%.

Example 5, MDI Prepolymer 240 pbw of a polypropyleneoxide triol with an average molecular weight of 4000, e.g. Voranol CP 4055 of Dow, 120 pbw of a polypropyleneoxide diol with an average molecular weight of 2000, e.g. Voranol CP 2025 of Dow, and 80 pbw 4,4'-diphenylmethane diisocyanate were mixed under nitrogen atmosphere in a suitable apparatus, e.g. a four-necked glass-flask equipped with a mechanical stirrer, stirred for 19 hours at 80° C. and then cooled and stored in a sealed container. The content of free isocyanate groups was 3.18%.

Formula for the Sealing Composition of Examples 6, 7 and 8, and Comparative Examples 3 and 4

| | | |
|---|---|---|
| Position 1 | 50 pbw | prepolymer of Example 4 |
| Position 2 | 20 pbw | Mesamoll (plasticizer of Bayer) |
| Position 3 | 3 pbw | Cabosil TS-720* (hydrophobe pyrogenic silicic acid of Cabot) |
| Position 4 | 5 pbw | titanium dioxide** |
| Position 5 | 20 pbw | Omya BLR 2** (chalk powder of Omya) |
| Position 6 | 0.1 pbw | hexahydrophthalic anhydride |

*dried during 15 hours at 100° C.
**dried during 15 hours at 120° C.

Example 6

Positions 1 to 5 of the formula for sealing compositions were homogeneously mixed under vacuum in a suitable blender, e.g. Planimax of Molteni, Milan, Italy. Then 3.51 pbw of the cycloaminal of Example 1 as well as position 6 of the formula for sealing compositions were added and also homogeneously mixed under vacuum. The sealing composition was then filled into air-tight cartridges.

Results see Table 1.

Example 7

Positions 1 to 5 of the formula for sealing compositions was homogeneously mixed under vacuum in a suitable blender, e.g. Planimax of Molteni. Then 4.36 pbw of the amino-aldimines of Example 2 as well as Position 6 of the formula for sealing compositions were added and also homogeneously mixed under vacuum. The sealing composition was then filled into air-tight cartridges.

Results see Table 1.

Example 8

Positions 1 to 5 of the formula for sealing compositions were homogeneously mixed under vacuum in a suitable mixer, e.g. Planimax of Molteni. Then about 3.81 pbw of the amino-aldimines of Example 3 as well as position 6 of the formula for sealing compositions were added and also homogeneously mixed under vacuum. The sealing composition was then filled into air-tight cartridges.

Results see Table 1.

Comparative Example 3

Positions 1 to 5 of the formula for sealing composition were homogeneously mixed under vacuum in a suitable blender, e.g. Planimax of Molteni. Then 3.02 pbw of the dialdimine of Comparative Example 1 as well as position 6 of the formula for sealing compositions were added and also homogeneously mixed under vacuum. The sealing composition was then filled into air-tight cartridges.

Results see Table 1.

Comparative Example 4

Positions 1 to 5 of the formula for sealing compositions were homogeneously mixed under vacuum in a suitable blender, e.g. Planimax of Molteni. Then 1.86 pbw of the cycloaminal of Comparative Example 2 as well as position 6 of the formula for sealing compositions were added and also homogeneously mixed under vacuum. The sealing composition was then filled into air-tight cartridges.

Results see Table 1.

Example 9, Adhesive 50 pbw of the prepolymer of Example 5, 15 pbw Mesamoll (plasticizer of Bayer), 15 pbw carbon black (dried for 15 hours at 120° C.) and 20 pbw Omya BLR 2 (chalk powder of Omya, dried for 15 hours at 120° C.) were homogeneously mixed under vacuum in a suitable blender, e.g. Planimax of Molteni. Then 5.26 pbw of the cycloaminal of Example 1 as well as 10 pbw xylene and 0.1 pbw hexahydrophthalic anhydride were added and also homogeneously mixed under vacuum. The adhesive was then filled into air-tight cartridges.

The adhesive has a paste-like consistency. The storage stability was excellent. During curing on fir-wood at 60° C. no blisters were formed, and the adhesive cured without any smell emission. The through-curing was 6 mm after three days at room temperature. The tensile strength was 4.7 MPa, the elongation at break 900% and the combined tension and shear resistance 3.4 MPa.

Example 10, Coating 50 pbw of the prepolymer of Example 4, 1 pbw Cabosil TS-720 (hydrophobe pyrogene silicic acid of Cabot, dried for 15 hours at 100° C.), 5 pbw titanium dioxide (dried for 15 hours at 120° C.) and 30 pbw Omya BLR2 (chalk powder of Omya, dried for 15 hours at 120° C.) were homogeneously mixed under vacuum in a suitable blender, e.g. Planimax of Molteni. Then 5.26 pbw of the cycloaminal of Example 1, 15 pbw solvent naphtha light (of Aral) as well as 0.1 pbw hexahydrophthalic anhydride were added and also homogeneously mixed under vacuum. The coating composition was then filled into an airtight container.

The coating was of liquid, self-levelling consistency. The storage stability was excellent. During the curing on fir-wood at 60° C., no blisters were formed and the coating cured without any smell emission. The through-curing was 6 mm after three days at room temperature. The tensile strength was 2.4 MPa and the elongation at break 800%.

TABLE 1

Results of the formulas for sealing compositions

|  | Ex. 6 | Ex. 7 | Ex. 8 | Comp. Ex. 3 | Comp. Ex. 4 |
| --- | --- | --- | --- | --- | --- |
| NCO excess (after reaction of all latent amino groups) | 0.55% | 0.55% | 0.55% | 0.55% | 0.55% |
| storage stability | good | good | good | good | not stable |
| through-curing after 3 days | 3.5 mm | 4 mm | 4.3 mm | 1.8 mm | not examined* |
| tensile strength | 2.4 MPa | 2.1 MPa | 2.7 MPa | 2.6 MPa | not examined* |
| elongation at break | 500% | 320% | 350% | 600% | not examined* |
| blister formation | no blisters | no blisters | no blisters | many blisters | not examined* |
| smell | free from smell | free from smell | free from smell | free from smell | intensive, disagreeable |
| weight loss after 4 weeks 40° C. | 0% | 0% | 0% | 0% | 0.9% |

*material no longer extrudable after a few days storage at room temperature

Discussion of the Results of Table 1:

The Examples 6, 7 and 8 differ in that different diamines with a primary and a secondary amino group have been used, that upon blocking with 3-phenoxy benzaldehyde form a cycloaminal structure or an aldemine structure dependent on the geometry of the diamine (see Examples 1 to 3). Independent on whether the latent amino group was present in the form of a cycloaminal (Example 6) or in the form of an aldimine (Examples 7 and 8), all three sealing compositions showed a good storage stability, fast curing without blister formation and without annoying smell, good mechanic strengths and no weight-loss during and after curing.

The Examples 6, 7 and 8 and the Comparative Example 3 differ in that in Examples 6, 7 and 8 the latent amino groups were bonded to the prepolymer, while in Comparative Example 3 a dialdimine was used, that was not bonded to the prepolymer. The content of NCO groups that remain after reaction of all latent amino groups and thus cure by reaction with humidity under $CO_2$-liberation, in all four examples was identical. Due to the binding of the latent amino groups to the prepolymer, the sealing compositions of Examples 6, 7 and 8 need less water for the cross-linking of the polymer chains. It is clearly recognizable that said sealing compositions cure much faster through the layer than the sealing composition of Comparative Example 3. After three days, the sealing compositions according to the present invention already showed a cured skin of 3.5 to 4.3 mm, while the sealing composition of Comparative Example 3 was only cured to a depth of 1.8 mm. Also with regard to the blister formation, a clear difference exists. The sealing compositions of Examples 6, 7 and 8, in spite of the NCO excess of 0.55%, showed no blister formation, while the sealing composition of Comparative Example 3 showed strong blister formation.

The Example 6 and the Comparative Example 4 differ with regard to the aldehyde, which has been used to block the primary amino group. In Example 6, the latent amino group has been formed by reaction with 3-phenoxy benzaldehyde, in Comparative Example 4, however, with isobutyraldehyde. Therefore, the sealing composition of Comparative Example 4 shows some disadvantages. Its storage stability is very bad. Already after a view days at room temperature, the sealing composition is no longer extrudable. Furthermore, it has a very intensive and unpleasant smell until the material is cured and the liberated aldehyde has entirely evaporated. Accordingly, it shows during the curing time (4 weeks at 40° C.) a loss of weight of 0.9%, about corresponding to the amount of isobutyraldehyde, that has been liberated. The sealing composition of Example 6, however, provides good storage stability, and the material cures without smell emission and without loss of weight.

While there are shown and described presently preferred embodiments of the invention, it is to be distinctly understood that the invention is not limited thereto but may be otherwise variously embodied and practiced within the scope of the following claims.

What is claimed is:

1. Humidity curing one-component polyurethane composition comprising a prepolymer represented by the following formula (I)

$$(NCO)_m A(B)_n \qquad (I)$$

in which A represents an (m+n)-valent radical as it is formed by the removal of (m+n) isocyanate groups from a (m+n)-valent polyurethane prepolymer, characterized in that m is 1 or 2, n is 1 or 2, and B is a latent amino group, bonded to A by a urea group bond, whereby B is defined by one of the following formulas (II) or (III)

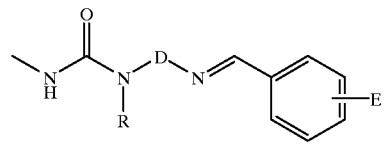

(II)

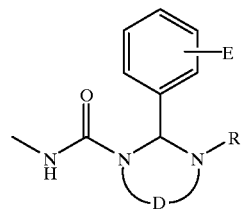

(III)

whereby R represents an aliphatic hydrocarbon radical with 1 to 8 C-atoms, a cycloaliphatic hydrocarbon radical with 5 to 15 C-atoms, or a phenyl radical, or an alkylphenyl radical with 7 to 15 C-atoms, D represents a divalent aliphatic hydrocarbon radical with 1 to 8 C-atoms, a divalent cycloaliphatic hydrocarbon radical with 5 to 15 C-atoms, or a divalent alkylphenyl radical with 7 to 15 C-atoms, or, in the case of formula (II), R and D form together with the nitrogen atom a five-membered or six-membered ring, substituted by a hydrocarbon chain with 1 to 5 C-atoms, carrying the aldimine group, and E represents a phenyl radical, an alkylphenyl radical, an optionally substituted phenyloxy radical or an optionally substituted alkyloxy phenyl radical.

2. The polyurethane composition of claim 1, wherein the radical E represents a phenoxy group in 3-position.

3. The polyurethane composition of claim 1, wherein the (m+n)-valent polyurethane prepolymer radical is formed by aromatic isocyanate units.

4. The polyurethane composition of claim 1, wherein the (m+n)-valent polyurethane prepolymer radical is formed by aliphatic isocyanate units.

5. The polyurethane composition of claim 1, wherein the (m+n)-valent polyurethane prepolymer radical comprises polyether polyol units.

6. The polyurethane composition of claim 1, wherein the (m+n)-valent polyurethane prepolymer radical is formed by polyester polyol units.

7. The polyurethane composition of claim 1, wherein the (m+n)-valent polyurethane prepolymer rest is formed by a mixture of polyether polyol units and polyester polyol units.

8. The polyurethane composition of claim 1, wherein the prepolymer has a mean molecular weight in the range of 500 to 20,000 g/mole.

9. The polyurethane composition of claim 1, that comprises an additional polyisocyanate with two or more isocyanate groups.

10. The polyurethane composition of claim 9 which comprises as further polyisocyanate, a polyisocyanate selected from the group consisting of a diisocyanate monomer, a diisocyanate oligomer or a polyurethane prepolymer with isocyanate end-groups, whereby the ratio of all isocyanate groups to the latent amino groups is 1:1 to 1:0.2.

11. A method for sealing joints, wherein a polyurethane composition of claim 1 is applied to the joint to be sealed.

12. A method for making an elastic bonding, wherein a polyurethane composition of claim 1 is applied to at least one surface and then brought into contact with the second surface.

13. A method for sealing areas by coating the respective area with a polyurethane composition of claim 1.

* * * * *